March 25, 1958
R. W. LAVENDER
2,828,118
ACCELEROMETERS
Filed March 4, 1954
2 Sheets-Sheet 1
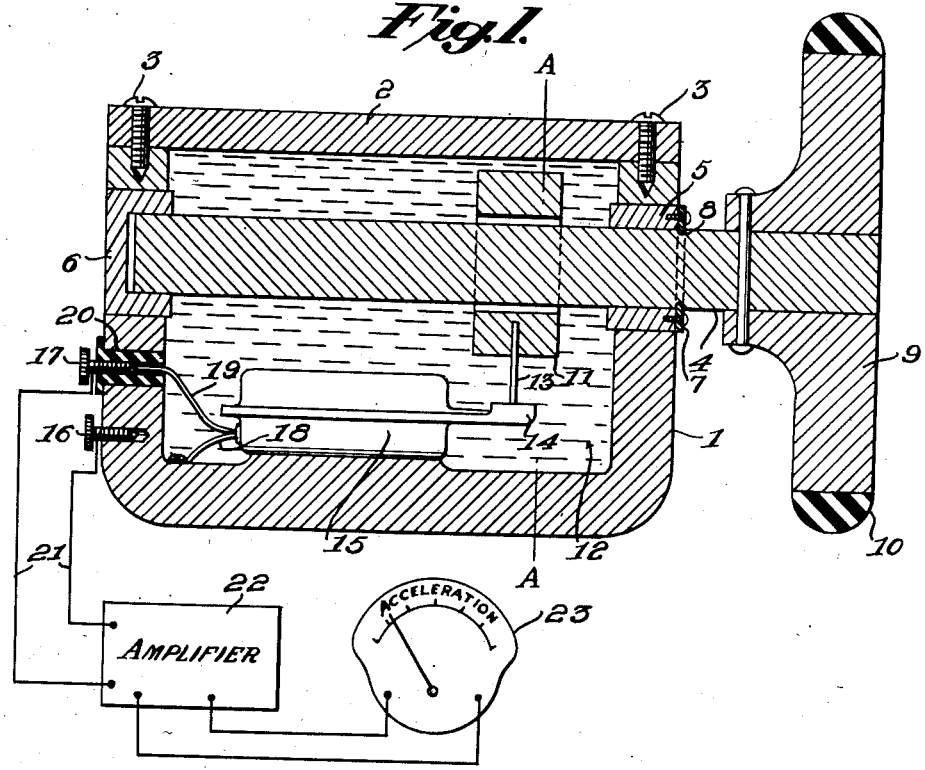
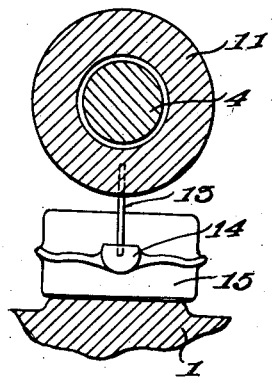
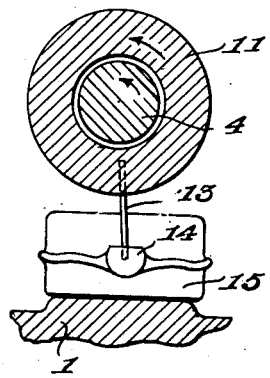
INVENTOR.
Raymond W Lavender
BY
ATTORNEY.

March 25, 1958  R. W. LAVENDER  2,828,118
ACCELEROMETERS
Filed March 4, 1954
2 Sheets-Sheet 2

INVENTOR
Raymond W. Lavender
BY
ATTORNEY

United States Patent Office 2,828,118
Patented Mar. 25, 1958

2,828,118

ACCELEROMETERS

Raymond W. Lavender, Binghamton, N. Y., assignor to General Aniline & Film Corporation, New York, N. Y., a corporation of Delaware Application March 4, 1954, Serial No. 414,037

1 Claim. (Cl. 264—1)

The present invention relates generally to rotational velocity indicating instruments, and more particularly to an apparatus or system for obtaining an electrical signal indicative of the acceleration of a rotating shaft.

Various systems for measuring the acceleration of a rotating shaft have been known to the prior art. These have depended either upon inertial masses in the measuring system or upon the measurement of the time rate of change of magnetic flux, or have utilized strain gauges. However, such systems are not suitable for the measurement of acceleration in shafts which are rotating at extremely low speeds, or wherein the acceleration is extremely small.

Briefly describing the present invention, the rotating shaft, the acceleration of which is to be determined, is slip coupled to a further rotatably deflectable element by means of a viscous liquid, and the deflectable element is restricted in its rotation by means of a spring or similar device. The angular deflection of this element is then directly proportional to the speed of the shaft and the viscosity of the liquid medium. This angular deflection may be measured in either of two manners. In accordance with a first embodiment of the invention the angular deflection of the rotatable element is caused to modify the mechanical strain of a piezo-electric transducer, which then generates a voltage which is a function of the strain. Changes in this voltage may be measured, indicated or recorded in any suitable manner.

In accordance with a second embodiment of the invention, the deflectable element is magnetically coupled to a position sensing device of the rotary differential transformer type, which generates an alternating voltage proportional to the angular displacement of the deflectable element relative to the transformer magnetic pole members. This voltage is rectified and filtered, and may be used directly for indicating the speed of the rotating shaft. In addition, this rectified and filtered voltage may be differentiated so that the resultant voltage output is, with suitable design of the electrical constants of the differentiating circuits involved, proportional to the acceleration of the shaft.

It is accordingly a broad object of the present invention to provide a novel accelerometer for rotating shafts.

It is a further object of the present invention to provide a novel accelerometer for rotating shafts, suitable for employment in connection with slowly rotating shafts, or in connection with shafts having relatively slight accelerations.

It is a further object of the invention to provide a system for measuring acceleration of a shaft, by coupling the shaft through a viscous medium with a resiliently restricted rotatable element, the angular deflection of the latter being then proportional to the velocity of the shaft.

It is another object of the invention to provide a system for measuring the acceleration of a rotating shaft by coupling the shaft to a resiliently restricted sleeve through a viscous liquid, and measuring the deflection of the sleeve in terms of voltage output of a piezo-electric transducer generated in response to movement of the sleeve.

Still another object of the present invention resides in the provision of a system for measuring acceleration of a rotating shaft by coupling the shaft via a viscous liquid to a spring biased sleeve, and measuring the angular motion of the sleeve by means of a rotary differential transformer, which generates an output voltage proportional to the angular displacement of the sleeve by varying the position of a movable magnetic member relative to stationary magnetic pole members.

Other objects and features will be apparent from the following description of the invention, pointed out in particularity in the appended claim, and taken in connection with the accompanying drawings in which:

Fig. 1 is a view in cross section taken longitudinally through a device arranged in accordance with the invention;

Fig. 2 is a view in transverse section taken along line A—A of Fig. 1 and showing the relative position of elements of the system when the main shaft is in a stationary position;

Fig. 3 is a view in transverse section taken along line A—A, corresponding to the view provided in Fig. 2, wherein, however, the main shaft is rotating in a clockwise direction;

Figure 4:
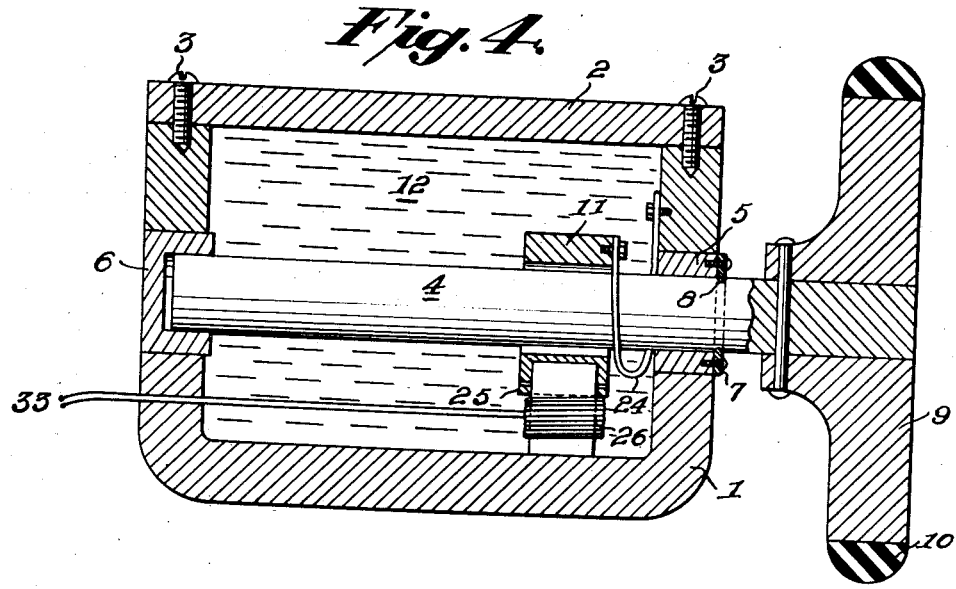
Fig. 4 is a view in cross section taken longitudinally of a modification of a system of Fig. 1, wherein a magnetic sensing device is utilized.

Referring now more specifically to the accompanying drawings, and particularly to Fig. 1 thereof, the reference numeral 1 denotes a cup shaped casing having a cover member 2 secured thereto by means of suitable screws 3. Extending internally of the casing 1 is a shaft 4, the acceleration of which is to be determined. The shaft 4 rotates in bearings 5 and 6, the bearing 5 being a shaft bearing having a retaining ring 7 cooperating with a groove 8 in the shaft 4 so as to prevent the sliding out of the latter and permit sealing between the shaft 4 and casing 1. The bearing 6 is an end bearing. Secured to that end of the shaft 4 which extends externally of the casing 1 is a wheel 9 having a peripheral friction ring 10 which may be fabricated of rubber or similar resilient material, and which serves to enable the wheel 9 to be frictionally driven.

Surrounding the shaft 4, internally of the casing 1, is a sleeve 11 which does not make contact with the shaft 4, but which is coaxial with respect thereto. The interior of the casing 1 is filled with a viscous liquid 12 which, in a preferred embodiment of the invention, may consist of silicone oil in order that the instrument may not be temperature sensitive. Accordingly, the shaft 4 is viscously coupled with the sleeve 11 and the rotation of the shaft 4 will tend to rotate the sleeve 11.

The sleeve 11 is supported in coaxial relationship with the shaft 4 by means of the pin 13 which is held by the actuating element 14 of a piezo-electric transducer 15. In this manner, the pin 13 will exert a lateral force on the element 14 of the crystal 15 when the shaft 4 is rotating. The transducer 15, when stressed by motion of the element 14, generates a voltage which appears at terminals 16 and 17. The terminal 16 is grounded to the case 1 and one of the leads 18 issuing from the piezo-electric transducer 15 is similarly grounded to the case 1 internally thereof. The remaining terminal 17 is mounted in an insulating bushing 20 extending through a wall of casing 1 and connected to the transducer 15 by a lead 19.

The terminals 16 and 17 are connected by external leads 21 to a suitable amplifier 22 and the output of the amplifier is indicated on a suitable meter 23.

It can be shown that the speed-torque relationship between the rotating shaft and the sleeve 11 is given by the mathematical expression $vs=t$, where $v$ is the viscosity of the liquid 12, $s$ is the speed of the shaft in revolutions per minute, and $t$ is the torque exerted on the sleeve 11 by the shaft 4 when it is rotating at speed $s$.

The output voltage from the crystal is proportional to the rate of change of the rotating shaft. Accordingly, the acceleration of the shaft $$\frac{ds}{dt}$$

is proportional to $exv$, where $e$ is the output voltage of the transducer 15.

In other words, the output voltage derived from the transducer is proportional to the acceleration of the shaft multiplied by the viscosity of the coupling liquid.

If the sole interest in taking the measurement resides in acceleration, the transducer and amplifier combination will give excellent results, the equipment being simple and inexpensive. It will be obvious, however, that the speed of the shaft may similarly be indicated by measuring a continuous voltage proportional to the speed, and calibrating this voltage in terms of velocity of the shaft. Since a crystal transducer in a circuit of finite impedance does not produce a sustained voltage upon a uniform stress, but only a voltage pulse when there is a change in the stress, it is particularly well suited for acceleration measurement but unsuitable for speed indication. For the latter, a different type of electrical sensing device is used which will be described in connection with the modification shown in Fig. 4.

In Fig. 2 is illustrated the orientation of the parts of the device of Fig. 1, when the shaft is stationary, and it will be evident that the coupling pin 13 is then vertical. When, however, the shaft rotates, as indicated in Fig. 3 of the accompanying drawings, the sleeve 11 is dragged along therewith by coupling through the viscous liquid 12 and, accordingly, the coupling pin 13 becomes slightly deflected in exerting a force upon the element 14.

Referring now more specifically to Fig. 4 of the accompanying drawings, and identifying the same parts in Fig. 1 and Fig. 4 by the same numerals of reference, it will be observed that in the embodiment of my invention illustrated in Fig. 4, the sleeve 11 is resiliently secured to a side wall of the casing 1, by means of a resilient member or spring 24, which permits slight angular motion of the sleeve 11 while retaining it generally in coaxial relationship to the main shaft 4. Secured to the sleeve 11, which may itself be fabricated of non-magnetic material, is a magnetic slug 25. Located within the casing 1 and adjacent the slug 25 is a rotary differential transformer, generally indicated by the reference numeral 26. The purpose of this transformer is to produce an alternating output voltage which is a direct function of the motion of the magnetic slug 26, and hence of the angular displacement of the sleeve 11.

Figure 5:
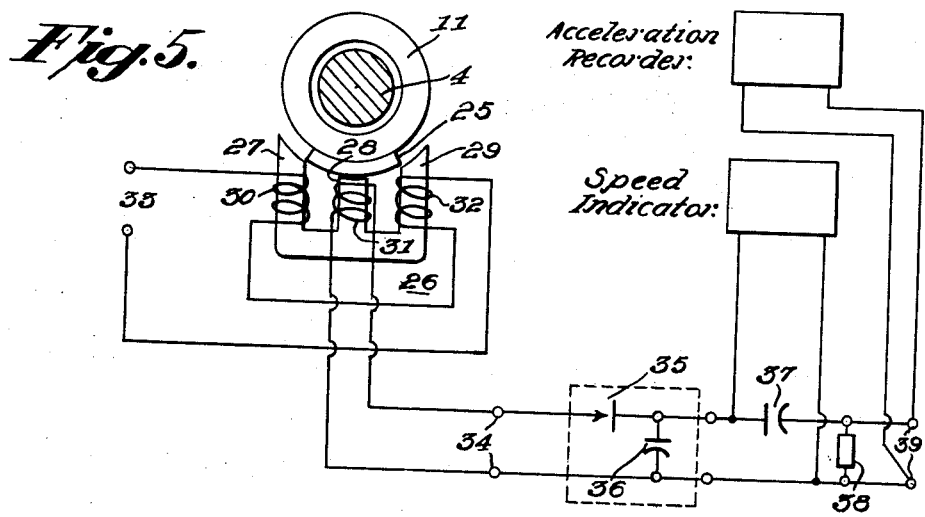
Fig. 5 is a schematic representation in transverse cross section, showing the electrical details of a rotary differential transformer of the type employed in the system of Fig. 4.

Referring more specifically to Fig. 5 of the accompanying drawings, the rotary differential transformer 26 will be seen to consist of a 3-legged or E-shaped core, having legs 27, 28, 29 supplied with windings 30, 31, 32, respectively.

The windings 30 and 32 are connected together in series opposition, while the winding 31 is inductively related to the other windings, being on the central leg 23 of the E-shaped core of the rotary differential transformer 26. The windings 30 and 32, connected in series opposition, are supplied with an A. C. voltage from terminals 33, and output signal is derived from winding 31 at terminals 34.

It will be clear, that since windings 30 and 32 are connected in series opposition, the flux produced by these windings in the central leg of the E-shaped core is zero so long as the slug 25 is symmetrically located with respect to the several legs. When, however, the sleeve 11 is angularly displaced, the magnetic slug 26 assumes an asymmetrical position with respect to the legs 27, 28, 29, and accordingly unbalances the transformer, permitting magnetic flux to exist in the central core 28 and, accordingly, producing an induced voltage in associated winding 31 which appears at terminals 34.

The voltage appearing at the terminals 34 is applied to a rectifier filter unit consisting of a series diode 35 and a shunt filter condenser 36 which produces a D. C. output proportional to the A. C. output voltage at the terminals 34. The rectified output voltage is thus proportional to the speed of the shaft and may be directly indicated by a suitable D. C. voltmeter graduated in terms of revolutions per unit time of the shaft 4.

To record the acceleration of the shaft 4, only the change in voltage across the condenser 36 is significant. Accordingly, for this purpose a differentiating network consisting of a series condenser 37 and a shunt resistance 38 is connected to the output of the rectifier-filter combination. It can then be shown that the voltage output at the terminals 39, i. e. at the output of the differentiating network, is proportional to the acceleration imparted to the shaft 4 and, in fact, is equal to the time constant (RC) of the differentiating network consisting of condenser 37 and resistance 38, the viscosity of the liquid 12, and the acceleration of the shaft 4.

The speed indicating and acceleration recording instruments, as connected, are shown merely in block diagram in Fig. 5 inasmuch as various types of standard voltage indicating and recording instruments may be used for this purpose.

While I have described and illustrated two specific embodiments of my invention, it will be appreciated that modifications of the specific embodiments illustrated and described may be resorted to without departing from the true spirit and scope of the invention as defined in the appended claim.

I claim:

An accelerometer for indicating the change in speed of a rotating shaft comprising a housing surrounding said shaft, two opposite side walls supporting bearings in which said shaft is free to rotate, a piezo-electric crystal element supported within said housing having a torsionable arm, a pin attached to said arm, a sleeve concentric with said shaft supported on said pin, and a fluid medium filling said housing and surrounding said shaft and said sleeve whereby changes in the speed of rotation of said shaft exert a rotational force through said fluid medium upon said sleeve causing torsionable displacement of said arm by means of said pin and producing electrical voltage pulses, the magnitude of which is proportional to the change of rotation of said shaft, an electrical connection through said housing from said piezo-electric element terminating in indicating means for said voltage pulses.

References Cited in the file of this patent

UNITED STATES PATENTS

| | | |
|---|---|---|
| 1,166,765 | Kaminski | Jan. 4, 1916 |
| 1,991,826 | Taylor | Feb. 19, 1935 |
| 2,321,992 | Canetta et al. | June 15, 1943 |
| 2,422,973 | Martin | June 24, 1947 |
| 2,488,586 | Diemer | Nov. 22, 1949 |
| 2,601,780 | Baecher | July 1, 1952 |
| 2,629,859 | Taylor | Feb. 24, 1953 |
| 2,668,043 | Winterburn | Feb. 2, 1954 |

FOREIGN PATENTS

| | | |
|---|---|---|
| 879,326 | Germany | June 11, 1953 |